United States Patent
Cave et al.

(10) Patent No.: US 7,978,642 B2
(45) Date of Patent: *Jul. 12, 2011

(54) SYSTEM AND METHOD FOR DETERMINING AIR INTERFACE INFORMATION FOR RADIO RESOURCE MANAGEMENT IN WIRELESS COMMUNICATIONS

(75) Inventors: Christopher Cave, Candiac (CA); Angelo Cuffaro, Laval (CA); Teresa Joanne Hunkeler, Montreal (CA); Maged Zaki, Pierrefonds (CA); Guodong Zhang, Farmingdale, NY (US); Juan Carlos Zuniga, Montreal (CA)

(73) Assignee: InterDigital Technology Corporation, Wilmington, DE (US)

(*) Notice: Subject to any disclaimer, the term of this patent is extended or adjusted under 35 U.S.C. 154(b) by 986 days.

This patent is subject to a terminal disclaimer.

(21) Appl. No.: 11/318,402

(22) Filed: Dec. 23, 2005

(65) Prior Publication Data

US 2006/0098603 A1    May 11, 2006

Related U.S. Application Data

(63) Continuation of application No. 10/748,015, filed on Dec. 30, 2003, now Pat. No. 7,050,412.

(60) Provisional application No. 60/480,844, filed on Jun. 23, 2003.

(51) Int. Cl.
H04B 7/185 (2006.01)
H04B 17/00 (2006.01)
H04W 4/00 (2009.01)
H04W 72/00 (2009.01)
H04J 3/12 (2006.01)

(52) U.S. Cl. ........ 370/317; 370/332; 370/522; 455/450; 455/67.11

(58) Field of Classification Search .................. 455/450, 455/452.2, 67.11; 370/331, 252, 317, 332
See application file for complete search history.

(56) References Cited

U.S. PATENT DOCUMENTS

| 6,246,881 | B1* | 6/2001 | Parantainen et al. | 455/450 |
| 6,721,568 | B1* | 4/2004 | Gustavsson et al. | 455/450 |
| 2002/0031105 | A1 | 3/2002 | Zeira et al. | |
| 2002/0147022 | A1* | 10/2002 | Subramanian et al. | 455/453 |
| 2003/0013451 | A1* | 1/2003 | Walton | 455/447 |
| 2004/0166835 | A1* | 8/2004 | Johansson et al. | 455/414.1 |

FOREIGN PATENT DOCUMENTS

WO    01/35692 A1    5/2001

* cited by examiner

Primary Examiner — Dang T Ton
Assistant Examiner — Ryan C Kavleski
(74) Attorney, Agent, or Firm — Volpe and Koenig, P.C.

(57) ABSTRACT

An air interface information unit including a measurement setup unit for implementing measurement setup procedures and configuration; a measurement reception and storing unit for storing actual, predicted and default air interface values and corresponding timestamps; a measurement processing unit for filtering, verifying, processing and combining air interface values; and a measurement output unit for providing air interface values to RRM functions upon request and triggering RRM functions when an air interface value exceeds a predetermined threshold.

10 Claims, 2 Drawing Sheets

SYSTEM AND METHOD FOR DETERMINING AIR INTERFACE INFORMATION FOR RADIO RESOURCE MANAGEMENT IN WIRELESS COMMUNICATIONS

CROSS REFERENCE TO RELATED APPLICATION

This application is a continuation of Ser. No. 10/748,015, now U.S. Utility Patent No. 7,050,412 filed Dec. 30, 2003, which claims priority from U.S. Provisional Application No. 60/480,844 filed Jun. 23, 2003, which are incorporated by reference as if fully set forth herein.

FIELD OF INVENTION

The present invention relates generally to wireless communication systems. More particularly, the invention is useful for wireless communication systems which use air interface values for radio resource management.

BACKGROUND

The purpose of radio resource management (RRM) in wireless communication systems is to efficiently manage the use of resources over the air interface, (i.e. radio resources). Intelligent management of radio resources is essential for maximizing the air interface capacity, ensuring connection reliability and network stability and reducing the battery consumption of wireless transmit/receive units (WTRUs).

Typical RRM functions include: 1) call admission control, which accepts or rejects requests for new radio links based on the system load and quality targets; 2) handover control, which ensures that a call (connection) is not dropped when a WTRU moves from the coverage area of one cell to the coverage area of another cell; 3) power control, which maintains interference levels at a minimum while providing acceptable link quality; 4) radio link maintenance, which ensures that quality of service requirements for individual radio links are satisfied; and 5) congestion control, which maintains network stability in periods of high congestion.

RRM functions are triggered, and make decisions, based upon a variety of inputs. Among these inputs, air interface measurements observed by the WTRU and the Node B are extensively used. Air interface measurements can originate from either the WTRU or the Node B. WTRU measurements and radio link specific Node B measurements are referred to as dedicated measurements. Cell-specific Node B measurements are referred to as common measurements. Both types of measurements are employed to precisely evaluate the current state of the radio environment. For example, interference measurements can be used to decide the allocation of physical resources in a timeslot or frequency band.

Typical measurements which RRM functions rely upon for evaluating the status of the radio environment include: interference signal code power (ISCP); received power measurements (both individual radio link and received total wideband power (RTWP)); received signal strength indicator (RSSI); transmission power, (including individual radio link power and total power); and signal-to-interference ratio (SIR) measurements. These measurements are just several examples of the many measurements that are applicable with the proposed invention.

As will be described hereinafter, some of these measurements can be predicted and a combination of their latest reports and their predictions can be used when the system is in a transient phase.

Unfortunately, there is a drawback in the manner in which current RRM functions are performed. There are several conditions that may cause the aforementioned measurements to be unavailable or invalid. First, it is possible that measurements are simply not reported, or measurement reports are corrupted over the air interface. For example, WTRU measurement reports are eventually encapsulated into transport blocks (TBs) to which cyclic redundancy check (CRC) bits are attached. The Node B physical layer determines whether an error occurred by examining the CRC bits. In the event of an error, the Node B physical layer can either deliver the erroneous TB to upper layers with an error indication, or simply indicate to upper layers that an erroneous TB was received on a particular transport channel or a set of transport channels. Such a scenario is particularly relevant when considering WTRU measurements since they are sent over the air interface.

Secondly, measurements generally have an age threshold, after which the measurement is considered invalid. If measurement reports are not frequent enough, it is possible that valid measurements will eventually become invalid, and thus unavailable to RRM functions.

Finally, it is possible that measurements are simply invalid because the radio link or the system has entered a transient phase that is undergoing stabilization. For example, interference measurements are unstable for a certain period of time, (up to ½ second), following the configuration or reconfiguration of a radio link due to the transient phase of the power control. Such measurements should not be used to trigger RRM functions or to make decisions since the current state of the radio link or the system is unstable.

Accordingly, an improved system and method for obtaining measurements for more effective radio resource management is needed.

SUMMARY

The present invention is a radio resource control system and method which manages air interface resources. According to the present invention, a wireless communication system obtains RRM data by determining availability and validity of certain system measurements. First it is determined whether actual system measurements and predicted measurements are available, and it is also determined whether the actual system measurements are valid. Depending upon the results of the determination, a selective combination of actual air interface measurements, predicted values and default values are used. Alternatively, the radio resources for which the RRM measurement is desired may not be allocated for use.

BRIEF DESCRIPTION OF THE DRAWINGS

A more detailed understanding of the invention may be had from the following description of preferred embodiments, given by way of example and to be understood in conjunction with the accompanying drawings wherein.

DETAILED DESCRIPTION OF THE PREFERRED EMBODIMENTS

The preferred embodiments are described herein in conjunction with an application of the invention for voice or data utilizing regular and HSDPA transmissions according to the Third Generation Partnership Project (3GPP) wideband code division multiple access (W-CDMA) communication system, which is an implementation of a Universal Mobile Telecommunications System (UMTS). Although 3GPP terminology is employed throughout this application, the 3GPP system is used only as an example and the invention can be applied to other wireless communications systems where measurement-based RRM is feasible.

As used throughout the current specification the terminology "wireless transmit/receive unit" (WTRU) includes, but is not limited to, a user equipment, mobile station, fixed or mobile subscriber unit, pager, or any other type of device capable of operating in a wireless environment. These exemplary types of wireless environments include, but are not limited to, wireless local area networks and public land mobile networks. The terminology "Node B" includes, but is not limited to, a base station, site controller, access point or any other type of interfacing device in a wireless environment.

Figure 1:
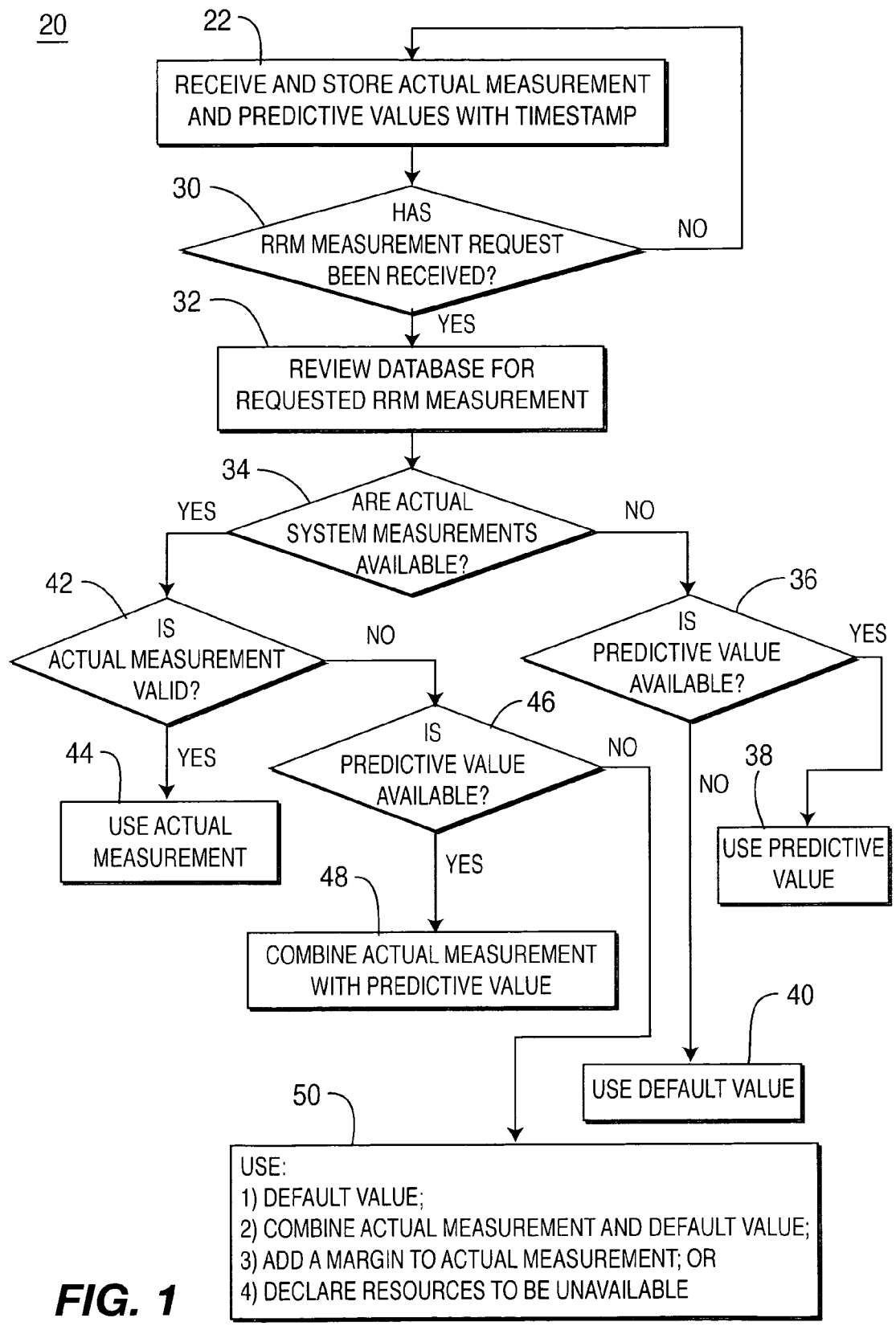
FIG. 1 is a flow diagram showing the use of different types of values for RRM functions in accordance with the present invention.

FIG. 1 is a flow diagram of a procedure 20 for determining measurement values for use by RRM functions in accordance with the present invention. First, actual measurements and predictive values are received and stored in a database along with a timestamp of when they were received (step 22). These measurements and values are received from different RRM functions such as call admission control, handover control, power control and radio link maintenance. Regardless of whether they are actual system measurements or predictive values, (such as, for example, in the case of the call admission control function which predicts the system impact upon acceptance of a new call), they are stored in a database. The RNC maintains the database of both the measurements and values and when they were stored.

Each time the RNC receives a measurement or value, it stores it in the database along with a timestamp corresponding to the time at which it is received. By doing so, the RNC can subsequently determine if measurements or values are available (i.e. stored in the database) and if so, if they are valid with respect to their age, (i.e. their age is less than a certain age threshold).

If an RRM measurement request has not been received as determined at step 30, no further action is taken other than to continue to receive and store actual measurements and predictive values at step 22. If a request for an RRM measurement has been received as determined at step 30, the RNC reviews the database for the requested RRM measurement to determine whether the requested RRM measurement is available. Measurements may be unavailable, (i.e. they are not stored in the database), either because no measurement report was sent or the measurement report was corrupted over the air interface. If actual system measurements are not available as determined at step 34, a determination is made as to whether predictive values are available (step 36).

The predictive values ($M_{PREDICTED}$) are determined as follows. When certain RRM functions perform an action, they can predict what certain system measurements, (such as interference or power), will be once the action is performed. For example, one RRM function is the Call Admission Control (CAC) algorithm. The CAC algorithm predicts what the interference and power will become once a call is added. If the predicted levels are acceptable, then the call is added; if the predicted levels are unacceptable, then the call is denied. In accordance with the present invention, these predicted interference and power values (along with other types of predicted values) are then stored and used as predicted values for interference and power. Since the prediction of RRM values is well known in the prior art for many different types of RRM functions, and the particular prediction method is not central to the present invention, it will not be described in detail hereinafter.

If predictive values are available, the predictive values are used (step 38), and if not, a default value is used (step 40).

A default value is a predetermined value which is established by historical conditions and or a series of measurements or evaluations. In essence, a default value is a predetermined value which is pre-stored and retrieved when desired. The default value is typically chosen such that RRM functions behave in a conservative way.

If actual system measurements are available as determined at step 34, then it is determined whether the actual system measurements are valid (step 42). As aforementioned, with respect to the validity of actual system measurements, these measurements may be invalid because they are too old, or may be invalid because the system is in a transient phase and hence, the measurements do not accurately represent the state of the system.

With respect to the age of a measurement, when a measurement report is received in the RNC database, it is assigned a timestamp. The timestamp corresponds to the time at which the measurement report was received. When the measurement is retrieved from memory, its timestamp is read. If the timestamp indicates that the measurement is older than a certain measurement age threshold (e.g. 1 second), then the measurement is deemed invalid.

With respect to the invalidity of a measurement because it is taken when the system is in a transient period, as aforementioned, each RRM function is associated with one or more RRM measurements. Each time an RRM function performs an action on the system, it determines the time at which the action was taken. This time corresponds to the start of the "transient period". The transition period lasts for a certain duration, after which point the system is considered stable again. The duration of the transient period depends on the type of action that was performed by the RRM function. The duration of the transient period is a design parameter.

If a particular RRM measurement is taken during the transient period of the RRM function, it is deemed to be invalid. This can be determined in several ways. In a first alternative, each RRM function is associated with an RRM measurement stored in the database and is an indication of whether or not the RRM measurement was taken during the transient period. Although these measurements are stored, they will be deemed invalid.

In a second alternative, a timestamp for the beginning of each RRM transient is stored separately. When an RRM measurement is retrieved from the database, its timestamp may be compared to the timestamp of the transient period. If the timestamp of the retrieved RRM measurement is within the transient period, (i.e. the timestamp of the beginning of the RRM transient plus the duration of the transient), the retrieved RRM measurement is determined to be invalid.

In a third alternative, actual measurements can be declared invalid by simply determining if a predicted measurement is in the database and if so, determining its timestamp. This alternative assumes that the transient period begins exactly when predicted measurements are written to the database. These alternatives are intended to be illustrative, not limiting, as there are many different ways that such a determination of invalidity may be effected.

The system determines the validity of an actual measurement in view of both age of the actual measurement and the stability of the system. If the actual measurement is valid as determined at step 42, then the actual measurement is used (step 44).

If the actual measurement is deemed not valid at step 42, a determination is made as to whether a predictive value is available (step 46). If a predictive value is available as determined at step 46, the actual measurement is combined with the predictive value (step 48).

The combination of actual measurements and predictive values as performed at step 48 will now be described. Although those of skill in the art realize that there are many different ways to combine the values, in one preferred embodiment, the present invention uses a combination of actual measurements (M ACTUAL) and predicted values (M PREDICTED) as follows:

$$M(t) = \alpha(t) \cdot M_{PREDICTED} + (1 - \alpha(t)) \cdot M_{ACTUAL}; \quad \text{Equation (1)}$$

where $\alpha(t)$ is a time-varying weighting function and t represent the amount for time elapsed since the initiation of the transient period (i.e. transient period starts at t=0). M(t) represents the combined measurement at time t which is provided to the RRM function. Typically, $\alpha$ is a monotonically decreasing function between one (1) and zero (0). Preferably $\alpha$ should equal 1 at t=0, immediately following the beginning of the transient period and $\alpha$ should equal 0 at the end of the transient period, once actual measurements are considered stable.

Figure 2A:
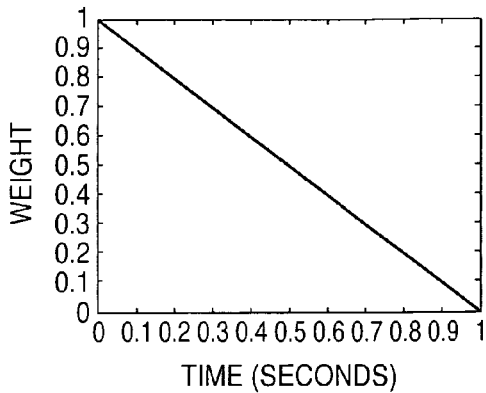
FIGS. 2A and 2B are time varying weighting functions used in accordance with the present invention.
Figure 2B:
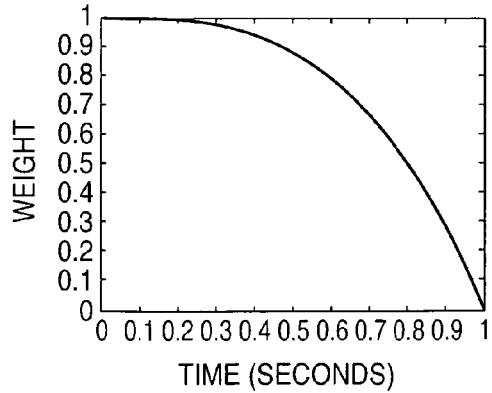

Example $\alpha$ weighting functions are shown in FIGS. 2A and 2B for a transient phase of 1 second duration. In FIG. 2A, the variation over time is a substantially straight line function, whereas in FIG. 2B the variation over time results in $\alpha$ initially diminishing at a slow rate, followed by a rapidly diminishing rate. This may be approximated by an exponential or geometric change, depending on the nature of $\alpha$.

It is possible that succeeding actions take place during the transient period, (i.e. before $\alpha$ has reached zero). When a subsequent action is taken by an RRM function, the system enters a "new" transient period. Since certain RRM functions typically predict what a value would be following an action that is taken at time $t_1$, the predicted value is based on M ($t_1$). In this case, $M_{PREDICTED}$ is made based on M ($t_1$), where $t_1$ is the time when the succeeding action is triggered.

Furthermore, t is reset to zero at the completion of the succeeding action, (i.e. a new transient period is started). If a new transient period is started, any subsequent RRM function that acts at $t_2$ would use $t_1$ as the beginning of the transient phase. As a result, t in Equation 1 would be $t=t_2-t_1$.

Referring back to FIG. 1, if it has been determined that the actual measurement is not valid as determined at step 42 and predictive values are not available as determined at step 46, then the RNC may implement one of the following four options (step 50): 1) use a default value as in step 40; 2) combine the actual measurement with a default value; 3) add a margin to the actual measurement; or 4) declare the resources at issue to be unavailable.

With respect to the first option, use of the default value, this was explained with reference to step 40.

With respect to the second option, combining the actual measurement and a default value, the RNC combines these in different ways depending upon the reason why the measurement is invalid. If the measurement is invalid because the latest actual measurement in the database is too old, then an equation similar to Equation 1 can be used:

$$M(t) = \alpha(t) \cdot M_{ACTUAL} + (1 - \alpha(t)) \cdot M_{DEFAULT}. \quad \text{Equation (2)}$$

In Equation 2, the time-decaying $\alpha$ term is applied to $M_{ACTUAL}$ and t is the elapsed time since the measurement was stored in the database. Preferably this $\alpha$ function differs from the one used in Equation 1 in that it is chosen to decay much more slowly.

If the actual measurement is declared invalid because the system is in a transient state, but fresh actual measurements are available, a weighted combination of the actual measurement and the default value is used:

$$M = A \cdot M_{ACTUAL} + B \cdot M_{DEFAULT}; \quad \text{Equation (3)}$$

where A+B=1 and the weighting factors A and B are configurable parameters that are optimized based on simulations or observations of the system. Note that different measurements could have different weighting factors.

With respect to the third option of adding a margin to the actual measurement, preferably a time-varying error margin is added to the actual measurement, as described by:

$$M = M_{ACTUAL} \pm \text{MARGIN}; \quad \text{Equation (4)}$$

where MARGIN is a time-varying margin which is large at time zero, immediately following the initiation of the transient period, and monotonically decreases toward zero as the transient period ends. As is the case with Equation (1), Equation (4) is executed when the actual measurements are available, but are deemed not to be valid due to a transient period or an expired timestamp. Note that this option is only valid in the case where measurements or metrics monotonically increase or decrease towards the converged value. In the case where measurements or metrics oscillate around the converged value, this option is not optimum.

This option has the advantage that predictive measurements need not be presumed to exist during the transient period. It is further possible to execute Equation (1) when predictive measurements are available and execute Equation (4) when MARGIN is considered the best "prediction".

With respect to the last option of step 50 regarding declaring resources to be unavailable, if it has been determined that actual measurements, predictive values, adding a margin to an actual measurement or a combination of any of these options is undesirable, the system may simply decline to send an RRM measurement and those resources for which the RRM measurement was requested will be deemed by the assistant to be unavailable. Accordingly, those resources will not be used.

The result of the determination as to whether to use the actual value at step 44, a predictive value at step 38, a default value at step 40, a combined actual measurement with a predictive value at step 48, or one of the options in step 50, is then used to provide the requested RRM measurement.

To facilitate the management of measurements, a centralized measurement control unit is utilized at the RNC. The centralized measurement control unit implements the following functions: 1) storing received measurements within a central structure; and 2) measurement processing, including measurement filtering, tracking measurement age and validity (e.g. assigning timestamp upon reception, and age threshold comparison), and selecting between or combining predicted values and actual measurements.

Figure 3:
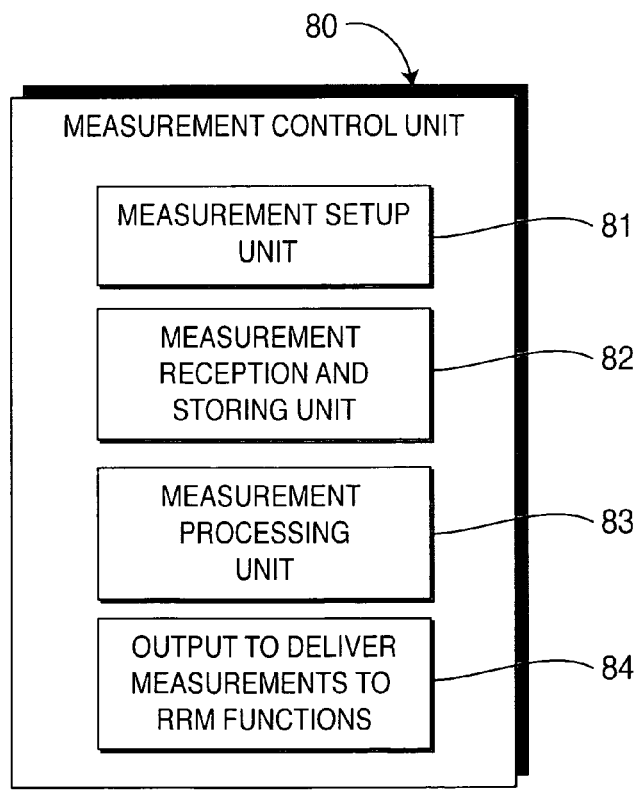
FIG. 3 is a centralized measurement control unit made in accordance with the present invention.

A centralized measurement control unit 80 made in accordance with the present invention is shown in FIG. 3. The measurement control unit 80 includes a measurement setup unit 81, a measurement reception and storing unit 82, a measurement processing unit 83 and a measurement output unit 84.

The measurement setup unit 81 implements the measurement setup procedures with respect to the WTRU and the Node B. It is responsible for the setup and configuration of measurements. More specifically, it communicates with the Node B and the WTRU RRC layers to setup, modify and end measurements, giving all measurement configuration details (e.g. averaging period, reporting criterion/period).

The measurement reception and storing unit 82 stores the actual and predicted WTRU and Node B measurements in an organized structure. This includes assigning timestamp information upon reception of a measurement in order to track the age of the measurement.

The measurement processing unit 83 filters received measurements, verifies measurement validity and/or availability and combining actual measurements, predicted values and default as appropriate. The measurement processing unit 83 is responsible for all of the measurement processing that is described in the present invention.

The measurement output unit 84 provides proper measurements to RRM functions upon request, (i.e. providing actual measurements when valid, predicted measurements when unavailable or invalid or a combination of actual measurements, predicted values and default values, such as are illustrated in FIG. 1 at steps 38, 40, 44, 48 and 50). Moreover, this measurement output unit 84 can optionally be responsible for triggering RRM functions when measurements exceed a predetermined threshold.

What is claimed is:

1. A radio resource control unit which monitors air interface resources and provides air interface data for radio resource management (RRM), comprising:
    a measurement unit configured to measure actual air interface values and a corresponding time of each measurement;
    a predictive processing unit configured to generate predicted air interface values before an RRM function performs an action, predictive of the effect of the action on an air interface;
    a default processing unit for generating default air interface values;
    a storage unit for storing the default values, predicted values and actual air interface measurements and corresponding measurement times; and
a processing unit configured to:
    process the stored default values, predicted values, and actual air interface measurements and corresponding times;
    determine whether the actual air interface measurements are valid, wherein the actual air interface measurements are valid on a condition that they were taken within a predetermined time period before the determining or whether the RRM function is not in a transient state at the time of the determining; and
    provide the actual air interface measurements or an alternative value to an RRM device, wherein the alternative value is one of: the predicted air interface values or the default air interface values.

2. The control unit of claim 1 wherein the processing unit provides the output data to the RRM device upon request.

3. The control unit of claim 1 wherein the processing unit provides the output data to the RRM device on a condition that an air interface value exceeds a predetermined threshold.

4. The control unit of claim 1 wherein the output data provided to the RRM device is any one of: values, predicted values, or default values.

5. A method for providing air interface data for use in radio resource management (RRM), comprising:
    measuring actual air interface values and a corresponding time of each measurement;
    obtaining predicted air interface values before an RRM function performs an action, predictive of the effect of the action on an air interface;
    obtaining default air interface values;
    storing the default values, predicted values, and actual air interface measurements and the corresponding measurement times; and
    processing the default values, predicted values, and actual air interface measurements and corresponding measurement times;
    determining whether the actual air interface measurements are valid, wherein the actual air interface measurements are valid on a condition that they were taken within a predetermined time period before the determining or whether the RRM function is not in a transient state at the time of the determining; and
    providing actual air interface measurements or an alternative value to the RRM functions, wherein the alternative value is one of: the predicted air interface values or the default air interface values.

6. The method of claim 5, wherein the default air interface values are determined using at least one of: historical conditions, a series of measurements, or a series of evaluations.

7. The method of claim 5, wherein processing the default values includes determining whether an actual air interface value is valid by comparing the corresponding time with a threshold, on a condition that the time is older than the air interface threshold, then the air interface value is declared invalid.

8. The method of claim 5, wherein processing the default value includes:
    determining an occurrence of a transient period; and
    determining whether an air interface value is valid by comparing the measurement time of the air interface measurement to the occurrence of the transient period, and on a condition that the time is within the transient period, the air interface value is declared invalid.

9. The method of claim 8, further comprising:
    performing a validity determination is performed on a condition that the actual air interface measurement is stored with a corresponding validity indicator.

10. The method of claim 5, wherein the air interface data is generated from a combination of at least two of: actual measurements, predicted values or default values.

* * * * *

UNITED STATES PATENT AND TRADEMARK OFFICE
CERTIFICATE OF CORRECTION

| | | |
|---|---|---|
| PATENT NO. | : 7,978,642 B2 | Page 1 of 1 |
| APPLICATION NO. | : 11/318402 | |
| DATED | : July 12, 2011 | |
| INVENTOR(S) | : Cave et al. | |

It is certified that error appears in the above-identified patent and that said Letters Patent is hereby corrected as shown below:

ON THE TITLE PAGE

Section (56) FOREIGN PATENT DOCUMENTS, page 1, right column, after "WO 01/35692 A 15/2001" insert:

--EP 1 297 635 4/2003
JP 10-065612 3/1998--.

Section (56) OTHER DOCUMENTS, page 1, right column, insert --REDANA ET AL., "Received Power Based Call Admission Control Techniques for UMTS Uplink," Proceedings of the IEEE 56th Vehicular Technology Conference, Volume 1, pp. 2206-2210 (September 24, 2002).--

IN THE CLAIMS

At Claim 4, column 8, line 5, after "any one of:" insert --actual--.

At Claim 9, column 8, line 49, after "determination" delete "is performed".

Signed and Sealed this
Twenty-fourth Day of January, 2012

David J. Kappos
*Director of the United States Patent and Trademark Office*